United States Patent [19]

Drechsler et al.

[11] 4,449,302
[45] May 22, 1984

[54] POWER RETURNABLE COILABLE RULE WITH IMPROVED BLADE LOCKING ASSEMBLY

[75] Inventors: Mark A. Drechsler, Southington; Walter J. Hutchins, West Hartford, both of Conn.

[73] Assignee: The Stanley Works, New Britain, Conn.

[21] Appl. No.: 447,681

[22] Filed: Dec. 7, 1982

[51] Int. Cl.³ .......................... G01B 3/10; B65H 75/48
[52] U.S. Cl. ..................................... 33/138; 242/84.8; 242/107.2
[58] Field of Search ................................. 33/138–139, 33/140; 242/84.8, 107, 107.15, 107.3, 107.2

[56] References Cited

U.S. PATENT DOCUMENTS

| 2,240,753 | 5/1941 | Bouchard et al. |
| 2,624,120 | 1/1953 | Mills |
| 3,041,004 | 6/1962 | Busch |
| 3,435,529 | 4/1969 | Quenot |
| 3,570,782 | 3/1971 | Hayes |
| 3,577,641 | 5/1971 | Smith |
| 3,578,259 | 5/1971 | Zelnick |
| 3,816,925 | 6/1974 | Hogan et al. |
| 4,131,244 | 12/1978 | Quenot |
| 4,194,703 | 3/1980 | Roe |

FOREIGN PATENT DOCUMENTS 2612627 3/1975 Fed. Rep. of Germany.
490306 4/1956 Italy.

Primary Examiner—Harry N. Haroian

[57] ABSTRACT

A power returnable coilable rule has elongated locking means extending from a lock button on the exterior of the casing to below the blade passage with an aperture thereon adjacent the blade passage and through which the blade extends. A lock element on the lower end of the locking means cooperates with an anvil to press the blade thereagainst and clamp the blade firmly therebetween. Biasing means biases the locking means into the blade locking position, and the lock button is depressible to release the blade during finger pressure and both depressible and movable into a position in which the locking means is releasably engaged to permit free movement.

26 Claims, 10 Drawing Figures

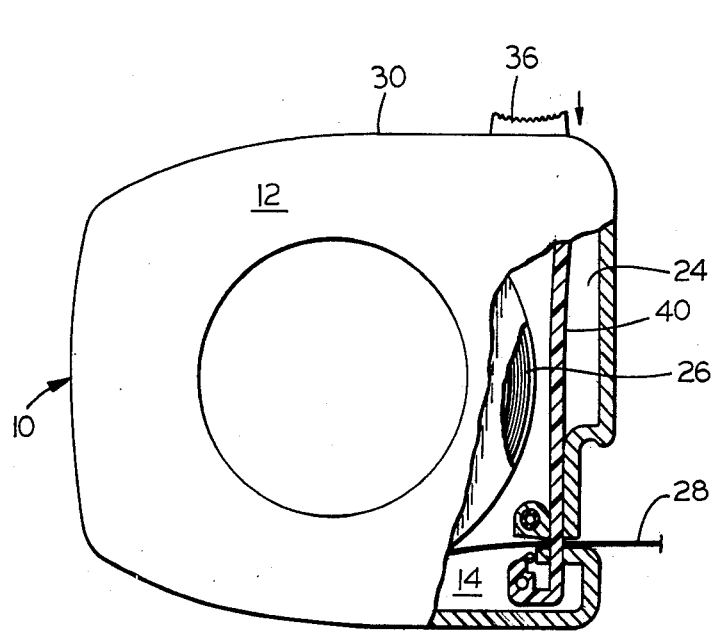
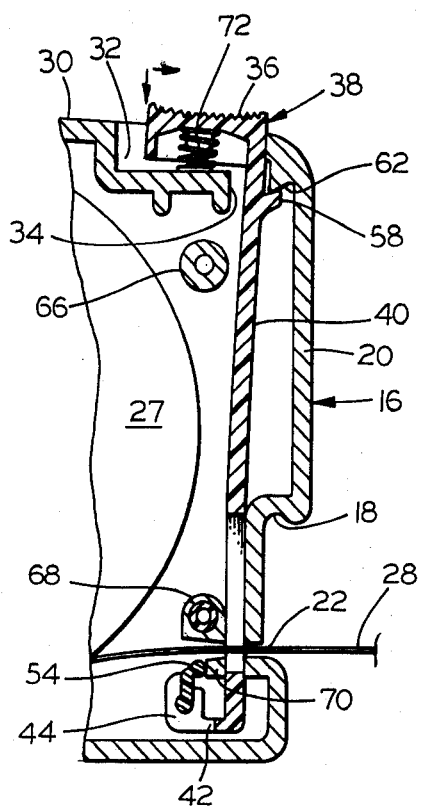
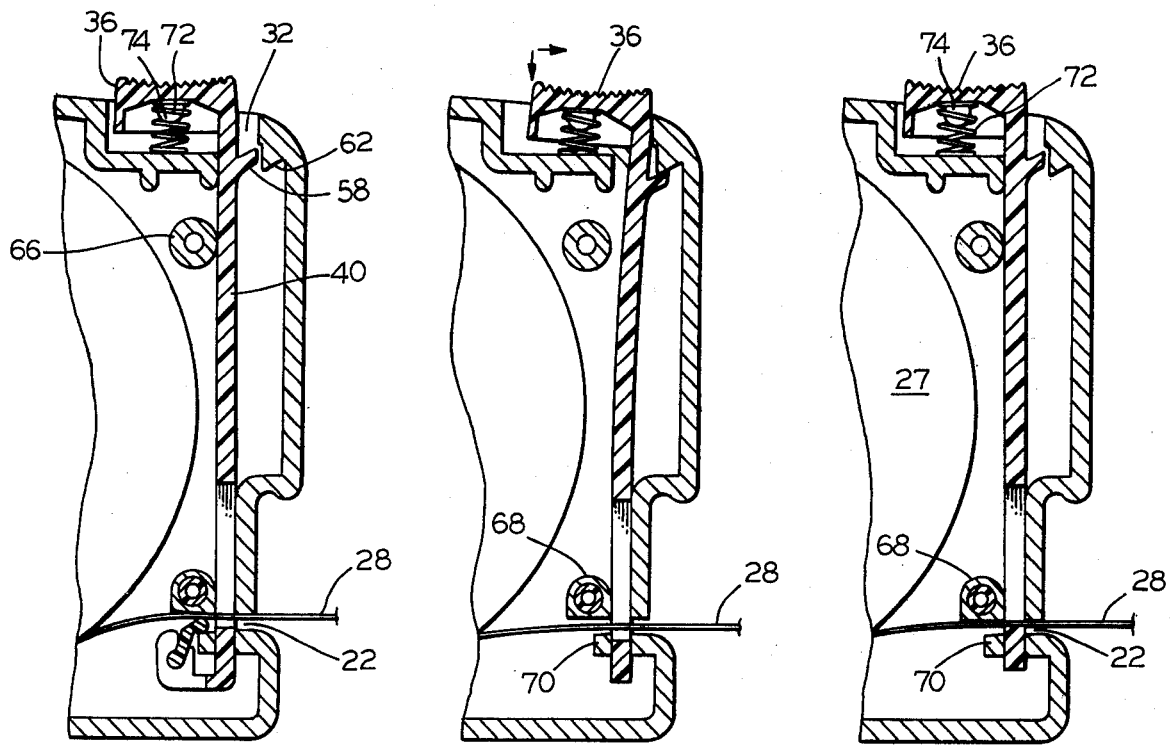
FIG. 1
FIG. 2
FIG. 3
FIG. 4
FIG. 5

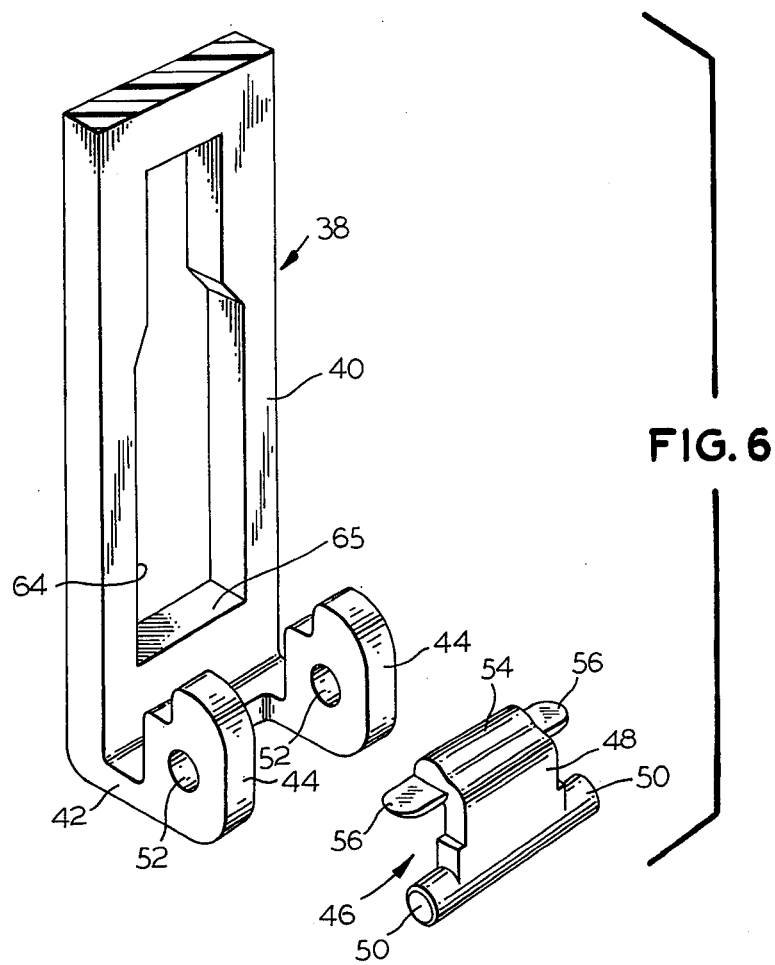
FIG. 6
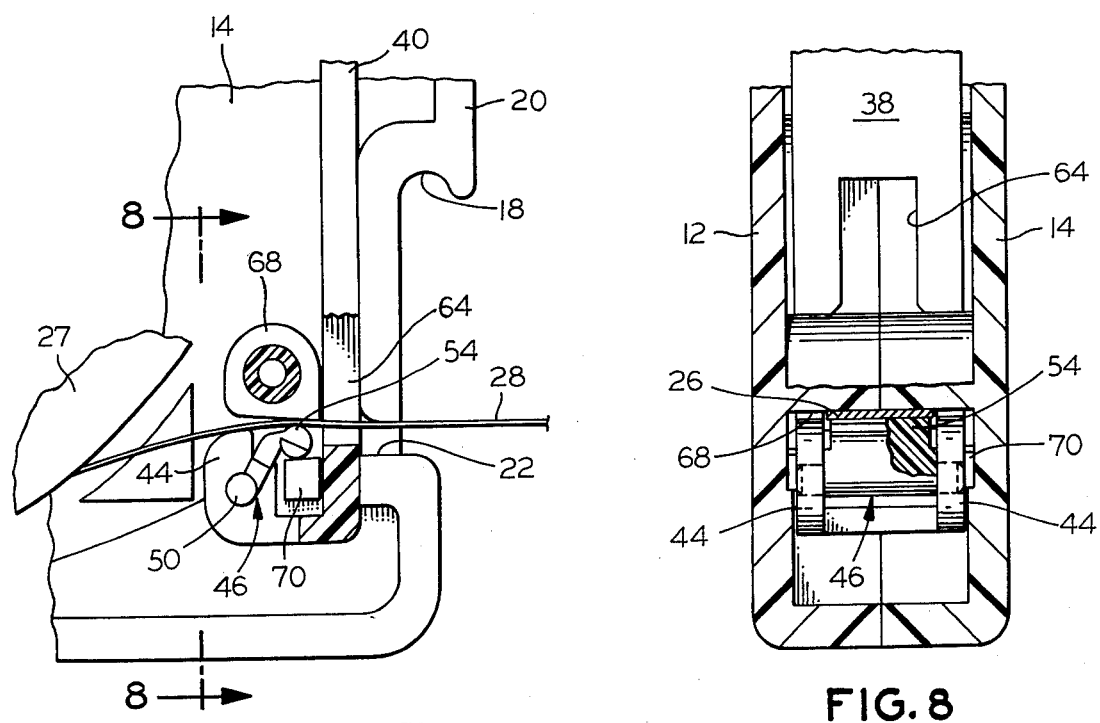
FIG. 7
FIG. 8

POWER RETURNABLE COILABLE RULE WITH IMPROVED BLADE LOCKING ASSEMBLY

BACKGROUND OF THE INVENTION

Power returnable coilable rules are widely employed because of the convenience and ease of operation which they afford the user. To hold the blade in an extended position against the retracting force of the power spring, numerous types of locking devices have been proposed and utilized. A highly effective lock is illustrated and claimed in U.S. Pat. No. 3,214,836, granted Nov. 2, 1965 to the assignee of the present invention as the assignee of Robert F. West.

As the length of the measuring blade increases, the available spring power exerted by the recoil spring must be increased. Accordingly, the gripping or clamping force of the blade lock must be strong enough to withstand not only the spring force but also the pull of the user as he or she pulls the blade taut between the hook at its outer end and the casing. However, the lock must still permit facile movement of the blade inwardly and outwardly of the casing as well as permit rapid locking and unlocking.

It is an object of the present invention to provide a power returnable coilable rule employing a novel blade locking mechanism which will securely grip the blade to hold it in an extended position and permit tensioning of the extended portion by the user, and which is readily releasable.

It is also an object to provide such a coilable rule in which the blade locking mechanism is comprised of relatively durable and easily fabricatable parts to provide a long lived assembly.

Another object is to provide such a coilable rule which is relatively economical and in which the parts may be readily assembled.

A further object is to provide such rule in which the lock button is movable among any one of three positions—a normal blade locking position, a finger-pressure blade releasing position, and a releasably engaged position in which the blade is freely movable.

SUMMARY OF THE INVENTION

It has now been found that the foregoing and related objects may be readily attained in a coilable rule wherein the casing has a pair of spaced end walls and a sidewall extending peripherally thereabout, with the end and side walls defining a chamber therewithin. The sidewall has a blade passage extending therethrough to the chamber and also a locking means aperture extending therethrough at a point spaced from the blade passage. A coiled blade is provided within the chamber of the casing and extends outwardly of the casing through the blade passage.

Movable in the chamber of the casing is blade locking means including an elongated lock arm extending along the sidewall between the blade passage and the locking means aperture, and this lock arm has an aperture therein through which the blade extends. An actuator button is provided at the end of the lock arm adjacent the locking means aperture and disposed outwardly of the casing for movement relative thereto. The locking means also includes a lock element at its other end which is engageable with the surface of the blade disposed away from the actuator button. Also within the chamber adjacent the other surface of the blade is anvil means on the casing cooperating with the lock element for clamping the blade therebetween to frictionally engage and retain the blade in an extended position.

The rule also includes biasing means normally biasing the lock arm in the direction of the actuator button to press the lock element against the blade and thereby clamp the blade between the lock element and the anvil means. The actuator button is movable to overcome the biasing means and move the lock arm longitudinally in the direction away from the actuator button and accordingly the lock element away from the blade. As a result, such movement releases the blade for movement freely inwardly and outwardly of the casing.

In the preferred embodiment, the blade locking means and the casing have cooperating means thereon releasably engageable upon movement of the actuator button to hold the blade locking means in the blade releasing position. The cooperating means conveniently comprise a shoulder on the casing and a boss on the lock arm providing a cooperating shoulder. The button is depressible to effect the blade releasing movement of the blade locking means, and is both depressible and movable parallel to the plane of the casing end walls to effect engagement of the cooperating means.

Desirably, the biasing means is a compression spring acting between the outer surface of the casing and the inner surface of the button, and the lock arm of the locking means is guided between the anvil means and the casing sidewall. Most usually, the blade passage is adjacent the lower end of the front portion of the sidewall, and the locking means aperture is adjacent the front end of the top wall portion of the sidewall. Preferably, the actuator button and lock arm are integrally formed.

In one embodiment, the lock element comprises the bottom edge of the aperture in the lock arm, and this bottom edge of the aperture in the lock arm also biases the blade against and into frictional engagement with the top edge of the blade passage in the casing sidewall.

In another embodiment, the locking means includes an element pivoted at its lower end at the lower end of the locking means and pivotable upon abutment against the lower surface of the blade. This embodiment includes a post member spaced from the anvil means and defining a channel therebetween through which the blade extends, and the lock element is pivotable into the channel to wedge therein and increase the locking pressure on the blade. Desirably, the lower surface of the anvil means is inclined downwardly toward the blade passage in the sidewall. Conveniently, the lock means includes a pair of flanges at the lower end of the blade arm, and the lock elements is pivotably mounted therebetween. Preferably, the lock element has an upstanding body portion pivoted on the flanges and a wedge portion extending from the upper end of the body portion toward, the anvil means and post member.

BRIEF DESCRIPTION OF THE DRAWINGS

FIG. 1 is an end elevational view of a power returnable coilable rule embodying the present invention with a portion of the casing broken away to reveal internal construction and showing the locking assembly as manually held in a blade releasing position, and with the extended portion of the blade only fragmentarily illustrated;

FIG. 2 is a fragmentary sectional view of the embodiment of FIG. 1 with the locking assembly releasably locked in a blade releasing position;

FIG. 3 is a similar sectional view with the locking assembly in the normal or at rest position wherein the blade is held or locked in position by the wedging action of the lock element;

FIG. 4 is a similar fragmentary sectional view of a coilable rule employing another embodiment of locking asssembly and with the locking assembly releasably locked in a blade releasing position;

FIG. 5 is a similar view of the embodiment of FIG. 4 with the locking assembly in the normal or at rest position wherein the blade is held in position by the lock arm;

FIG. 6 is a fragmentary exploded view to an enlarged scale of the lower portion of the locking means of FIGS. 1-3;

FIG. 7 is is an enlarged view of the several parts of the locking assembly as seen in FIG. 3;

FIG. 8 is a fragmentary sectional view along the line 8—8 of FIG. 7 to an enlarged scale;

DETAILED DESCRIPTION OF THE ILLUSTRATED EMBODIMENT

Figure 9:
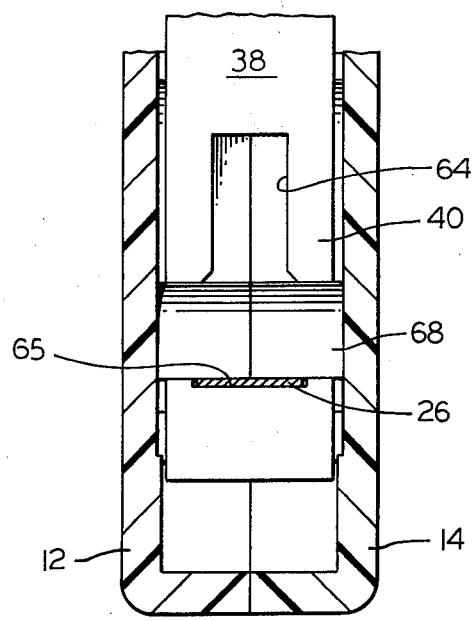
FIG. 9 is a similar sectional view along the line 9—9 of the locking assembly as seen in FIG. 10.

Turning first in detail to the embodiment of FIGS. 1-3 and 6-8, a power returnable coilable rule embodying the present invention has a housing or casing generally designated by the numeral 10 with end walls 12, 14 and a peripheral sidewall generally designated by the numeral 16 and extending therebetween. The side wall 16 has a hook recess 18 in its front wall portion 20, at the lower end of which is a blade passage or aperture 22 extending therethrough. Disposed within the chamber 24 provided by the housing 10 is a helically coiled metal measuring blade 26 which has its outer end portion 28 extending outwardly through the blade passage 22.

The upper wall portion 30 of the sidewall 10 has a lock button recess 32 adjacent the front wall portion, and a lock aperture 34 extends therethrough at the forward end thereof. Seated in the lock button recess 32 is the lock button 36 of the locking member generally designated by the numeral 38, and the elongated lock arm 40 depends from the forward end of the button 36 substantially rectilinearly along the front wall portion 20 to a point below the blade passage 22. At the side margin of its lower end is a pair of generally L-shaped flanges 42 which extend inwardly or away from the front wall portion 20 and provide a pair of spaced, upwardly disposed finger portions 44. Pivotably mounted between the finger portions 44 is a lock element generally designated by the numeral 46 and having an upwardly extending body portion 48 with laterally extending pivot pins 50 against its lower end seated in pivot apertures 52 in the finger portions 44. Extending forwardly and upwardly from the upper end of the body portion 48 is a wedge portion 54 which has stop pins 56 projecting laterally therefrom which will abut the upper edges of the finger portions 44 to limit pivoting of the lock element 46 in the direction away from the front wall portion 20.

The lock arm 40 has a boss 58 on its forward surface adjacent its upper end, and the boss 58 provides a forwardly and upwardly inclined shoulder which will lock under a cooperatively inclined shoulder 62 provided on the front wall portion 20 of the sidewall 16. Adjacent its lower end the lock arm 40 has a vertically elongated aperture 64 therethrough which is in part aligned with the blade passage 22 and through which extends the end portion 28 of the blade 26.

Provided on the casing 10 within the chamber 24 spaced below but adjacent the lock button recess 32 and the front wall portion 20 is a post 66. Also provided on the casing respectively above and below the blade passage 22 and spaced inwardly from the hook recess 18 are a large post 68 and a small post 70, which have their respective opposing faces generally aligned with the upper and lower edges of the blade passage 22. As best seen in FIG. 7, the lower surface of the post 68 is inclinded downwardly and forwardly, and the upper surface of the post 70 is inclined upwardly and forwardly. The lower portion of the lock arm 40 is guided between the inside surface of the front wall portion 20, the posts 68, 70; and movement of its upper portion away from the front portion 20 is limited by the post 66 and the edge of the sidewall 16 defining the aperture 34.

The locking member 38 is biased upwardly by the compression spring 72 which acts between the inner surface of the lock button 36 and the outer surface of the lock recess 32. The spring 72 is seated on a guide pin 74 within the downwardly opening cavity of the button 36 in which it is seated. Because the locking member 38 has the blade 26 extending through its aperture 64, its movement outwardly of the lock aperture 34 of the casing 10 is limited thereby.

As is conventional, the two sections 12, 14 of the casing 10 are held together by fasteners (not shown) seated in posts 66, 68 and other posts (not shown). The blade 26 is coiled about a reel 27 and has its inner end attached to a coiled power return spring (not shown) within the reel. A hook (not shown) is provided on the outer end of the blade 26 to permit engagement of the end of the blade 26 with a workpiece (not shown), and it is dimensioned and configured so that it will snugly seat in the hook recess 18 in the front wall portion 20 of the sidewall 16.

In the operation of this embodiment, the spring 72 normally biases the locking member 38 upwardly. As seen in FIGS. 3, 7 and 8, the locking member 38 at its lower end has its wedge portion 54 bearing against the lower surface of the blade 26, and this biasing pressure causes the lock element 46 to pivot forwardly as the blade is moved outwardly and move into the spacing between the posts 68, 70. Thus, the wedge portion 54 presses the blade 26 against the tapered lower surface of the upper post 68 as it wedges between the blade 26 and the small post 70, and this results in firm frictional gripping of the blade 26 so that the extended portion of the blade 26 may be tensioned between the hook at its outer end and the casing 10 to minimize sagging and avoid inaccurate measurements.

To permit rapid extension or retraction of the blade 26, the lock button 36 is depressed by the user's thumb to overcome the biasing pressure of the spring 72 as shown by the arrow in FIG. 1. This causes the lower portion of the lock arm 40 to move downwardly and to pivot and withdraw the wedge portion 54 from the wedging position shown in FIG. 3 to the release position shown in FIG. 1. In this position of the locking member 38, the blade 26 may move freely in and out through the elongated aperture 64 in the lock arm 40. After the desired movement has been effected, release of the finger pressure on the lock button 36 will allow the biasing action of the spring 72 to move the locking member 38 upwardly and the wedge portion 54 back to the wedging position seen in FIG. 3.

To permit free movement of the blade 26 in and out of the casing without having to maintain finger pressure on the lock button 36, the lock button 36 may be depressed and moved forwardly as shown by the arrows in FIG. 2 to move the boss 58 on the lock arm 40 under the shoulder 62 on the front wall portion 20 of the casing sidewall 16. Release of the finger pressure then allows the spring 72 to move the lock arm 40 upwardly and bias the cooperating shoulders into abutment as seen in FIG. 2, thus latching the locking member 38 in the blade releasing position.

Figure 10:
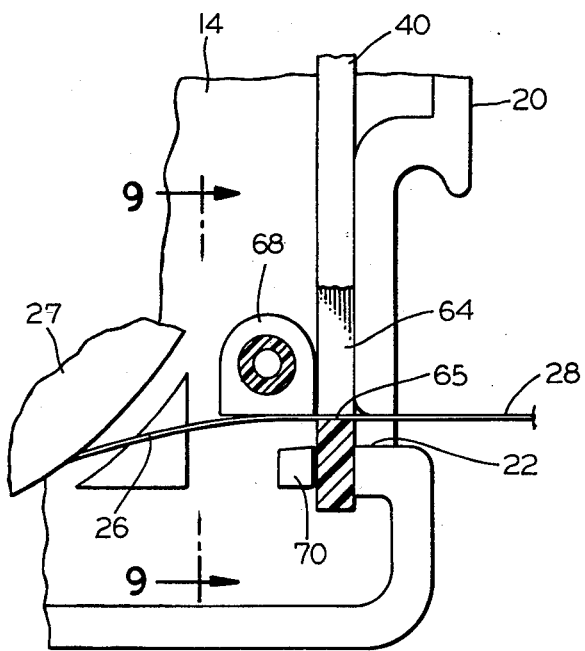
FIG. 10 is an enlarged view of the several parts of the locking means as seen in FIG. 5.

Turning now to the embodiment of FIGS. 4, 5, 9 and 10, the general construction of the rule is the same as that of the prior embodiment and the same reference numerals are applicable thereto because the only difference is in the construction providing the lock mechanism at the lower portion of the locking member 38.

In this embodiment, the lock arm 40 terminates below the small post 70 and the blade passage 22, and the blade 26 is locked by frictional pressure between the lower edge 65 of the aperture 64 in the lock arm 40 and the lower surface of the large post 68 and the upper edge of the blade passage 22 in the sidewall 16.

As seen in FIG. 5, the normal or at rest position of the assembly is one in which the spring 72 biases the lock button 36 and locking member 38 upwardly. Since the blade 26 passes through the aperture 64 in the lock arm 40, below the large post 68 and through the blade passage 22, the blade 26 is thus held firmly against the lower surface of the large post 68 and upper edge of the blade passage 22 by the lower edge 65 of the blade aperture 64 in the lock arm 40.

Depressing the lock button 36 moves the lock arm 40 downwardly and thereby the lower edge 65 of the blade aperture 64 away from the post 68 and blade 26. Thus, the blade 26 may be moved freely inwardly and outwardly until the user releases the downward pressure on the lock button 36 to clamp the blade 26 in the position seen in FIGS. 5 and 9–10.

As seen in FIG. 4, depressing and moving forwardly the lock button 36 will engage the boss 58 on the arm 40 under the shoulder 62 to hold the parts in the blade releasing position. As a result, the blade 26 may be moved freely both inwardly and outwardly of the casing 10 to facilitate multiple measurements.

As will be readily appreciated, the locking assembly in either of the illustrated embodiments permits facile manipulation by the user to release the locking engagement of the blade during only the time of finger pressure application or for an extended period of time by moving the lock button both downwardly and forwardly to effect engagement of the cooperating shoulders. In either embodiment, the lock is positive acting in the normal or at rest position of the locking assembly so as to prevent inadvertent movement of the blade. Moreover, the relatively few parts and their relatively simple construction enables long lived and trouble-free operation.

It will be appreciated that the locking member is most conveniently fabricated from a synthetic resin providing strength and sufficient resilient deflection over the length of the lock arm to enable the deflection of the upper portion into engagement with the shoulder on the front portion of the sidewall. Such resins include acetal, nylon, polyethylene, polypropylene, ABS, glass-filled polyester resins, polyurethanes, and the like. Moreover, the fabrication of the lock arm and actuator button as an integral unit is conveniently effected by injection molding. However, other means of fabrication may be employed and other materials including metal may be employed if so desired.

Similarly, the two sections of the casing or housing including the posts are preferably integrally formed from synthetic resin or metal.

The unmodified or as-formed surfaces of the posts and lock arm and wedge have been found sufficient to provide secure engagement of the blade. However, if so desired, the frictional characteristics of the surfaces may be augmented by providing friction-generating patterns thereon, by coating them with a high friction material such as a rubber latex, by providing a pad of a high friction material thereon, etc. In practice, it has been found highly effective to mold the pivoted lock element of the first embodiment from a glass-filled polyester elastomer sold by Liquid Nitrogen Products under the designation YF-1004.

Thus, it can be seen from the foregoing detailed specification and drawings that the coilable rules of the present invention employ a novel and highly effective blade locking mechanism which will hold the blade in an extended position and which is readily releasable. The parts of the assembly may be readily fabricated from relatively durable materials and may be readily assembled to provide a long lived assembly. The lock button may be readily moved among the normal blade locking position, a finger-pressure blade releasing position, and a releasably engaged position in which the blade is freely movable.

Having thus described the invention, we claim:

1. In a power returnable coilable rule, the combination comprising:

A. a casing having a pair of spaced end walls and a sidewall extending peripherally thereabout, said end and side walls defining a chamber therewithin, said sidewall having a blade passage therethrough to said chamber and a locking means aperture therethrough spaced from said blade passage;

B. a coiled blade within said chamber of said casing and extending outwardly of said casing through said blade passage;

C. blade locking means movable in said chamber of said casing including (1) an elongated lock arm extending along said sidewall between said blade passage and locking means aperture, and having an aperture therein through which said blade extends, (2) an actuator button at the end of said lock arm adjacent said locking means aperture and disposed outwardly of said casing for movement relative thereto, (3) and lock means at the other end of said lock arm engageable with the surface of said blade disposed away from said actuator button;

D. anvil means on said casing within said chamber adjacent the other surface of said blade cooperating with said lock means for clamping said blade therebetween to frictionally engage said blade in an extended position; and E. biasing means normally biasing said lock arm in the direction of said actuator button to press said lock means against said blade and thereby clamp said blade between said lock means and said anvil means, said actuator button being movable to overcome said biasing means and move said lock arm longitudinally in the direction away from said actuator button and said lock means away from said blade and thereby release said blade for movement freely inwardly and outwardly of said casing.

2. The coilable rule of claim 1 wherein said blade locking means and said casing have cooperating means thereon releasably engageable upon movement of said actuator button to hold said blade locking means in said blade releasing position.

3. The coilable rule of claim 2 wherein said cooperating means comprise a shoulder on said casing and a boss on said lock arm providing a cooperating shoulder.

4. The coilable rule of claim 1 wherein said button is depressible to effect said blade releasing movement of said blade locking means.

5. The coilable rule of claim 2 wherein said button is both depressable and movable parallel to the plane of said casing end walls to effect engagement of said cooperating means.

6. The coilable rule of claim 1 wherein said biasing means is a compression spring acting between the outer surface of said casing and the inner surface of said button.

7. The coilable rule of claim 1 wherein said arm of said locking means is guided between said anvil means and said casing sidewall.

8. The coilable rule of claim 1 wherein said blade passage is adjacent the lower end of the front portion of said sidewall and said locking means aperture is adjacent the front end of the top wall portion of said sidewall, and wherein said actuator button and lock arm are integrally formed.

9. The coilable rule of claim 1 wherein said lock means comprises the bottom edge of said aperture in said lock arm.

10. The coilable rule of claim 9 wherein said bottom edge of said aperture in said lock arm also biases said blade against and into frictional engagement with the top edge of said blade passage in said casing sidewall.

11. The coilable rule of claim 1 wherein said lock means includes an element pivoted at its lower end at the lower end of said lock arm and pivotable upon abutment against the lower surface of said blade.

12. The coilable rule of claim 11 wherein said combination includes a post member spaced from said anvil means and defining a channel therebetween through which said blade extends, said element being pivotable into said channel to wedge therein and increase the locking pressure on said blade.

13. The coilable rule of claim 12 wherein the lower surface of said anvil means is inclined downwardly toward said blade passage in said sidewall.

14. The coilable rule of claim 13 wherein said lock means includes a pair of flanges at the lower end of said lock arm and said element is pivotably mounted therebetween, said element having an upstanding body portion pivoted on said flanges and a wedge portion extending from the upper end of said body portion toward said anvil means and post member.

15. In a power returnable coilable rule, the combination comprising:

A. a casing having a pair of spaced end walls and a sidewall extending peripherally thereabout, said end and side walls defining a chamber therewithin, said sidewall having a blade passage therethrough to said chamber and a locking means aperture therethrough spaced from said blade passage;

B. a coiled blade within said chamber of said casing and extending outwardly of said casing through said blade passage;

C. blade locking means movable in said chamber of said casing and including (1) an elongate lock arm extending along said sidewall between said blade passage and locking means aperture and having an aperture therein through which said blade extends, (2) an actuator button at the end of said lock arm adjacent said locking means aperture and disposed outwardly of said casing for movement relative thereto, (3) an element pivoted at its lower end on the other end of said locking means and pivotable upon abutment against the lower surface of said blade;

D. anvil means on said casing within said chamber adjacent the other surface of said blade and cooperating with said element of said locking means to clamp said blade therebetween to frictionally engage said blade in an extended position; and E. biasing means normally biasing said blade arm in the direction of said actuator button to press said element against said blade and thereby clamp said blade between said element and said anvil, said actuator button being movable to overcome said biasing means and move said lock arm longitudinally in the direction away from said actuator button and said element away from said blade and thereby release said blade for movement freely inward and outwardly of said casing.

16. The coilable rule of claim 15 wherein said assembly includes a post member spaced from said anvil means and defining a channel therebetween through which said blade extends, said element being pivotable into said channel to wedge therein and increase the locking pressure on said blade.

17. The coilable rule of claim 16 wherein the lower surface of said anvil means is inclined downwardly toward said blade passage in said sidewall.

18. The coilable rule of claim 17 wherein said locking means includes a pair of flanges at the lower end of said lock arm and said element is pivotably mounted therebetween, said element having an upstanding body portion pivoted on said flanges and a wedge portion extending from the upper end of said body portion toward said anvil means and post member.

19. The coilable rule of claim 15 wherein said blade locking means and said casing have cooperating means thereon releasably engageable upon movement of said actuator button to hold said blade locking means in said blade releasing position, and wherein said cooperating means comprise a shoulder on said casing and a boss on said lock arm providing a cooperating shoulder.

20. The coilable rule of claim 19 wherein said button is depressible to effect such blade releasing movement of said blade locking means, and wherein said button is both depressible and movable parallel to the plane of said casing end walls to effect engagement of said cooperating means.

21. The coilable rule of claim 15 wherein said lock arm of said locking means is guided between said anvil means and said casing sidewall, and wherein said blade passage is adjacent the lower end of the front portion of said sidewall and said locking means aperture is adjacent the front end of the top wall portion of said sidewall and wherein said actuator button and arm are integrally formed.

22. In a power returnable coilable rule, the combination comprising:

A. a casing having a pair of spaced end walls and a sidewall extending peripherally thereabout, said end and side walls defining a chamber therewithin, said sidewall having a blade passage therethrough to said chamber and a locking means aperture therethrough spaced from said blade passage;

B. a coiled blade within said chamber of said casing and extending outwardly of said casing through said blade passage;

C. blade locking means movable in said chamber of said casing including (1) an elongated lock arm extending along said sidewall between said blade passage and locking means aperture, and having an aperture therein through which said blade extends, (2) an actuator button at the end of said arm adjacent said locking means aperture and disposed outwardly of said casing for movement relative thereto, (3) the edge of said arm aperture adjacent the surface of said blade disposed towards the other end of said arm being engaged with said blade surface in one position of said locking means and removed therefrom in a second position of said locking means;

D. anvil means on said casing within said chamber adjacent the other surface of said blade and cooperating with said edge of said arm aperture for clamping said blade therebetween to frictionally engage said blade in an extended position;

E. biasing means normally biasing said blade arm in the direction of said actuator button to press said edge of said arm aperture against said blade and thereby clamp said blade between said edge of said arm aperture and said anvil means, said actuator button being movable to overcome said biasing means and move said lock arm longitudinally in the direction away from said actuator button and said edge of said arm aperture away from said blade and thereby release said blade for movement freely inwardly and outwardly of said casing.

23. The coilable rule of claim 22 wherein said bottom edge of said aperture in said lock arm also biases said blade against and into frictional engagement with the top edge of said blade passage in said casing sidewall.

24. The coilable rule of claim 22 wherein said lock arm of said locking means is guided between said anvil means and said casing sidewall, and wherein said blade passage is adjacent the lower end of the front portion of said sidewall and said locking means aperture is adjacent the front end of the top wall portion of said sidewall and wherein said actuator button and arm are integrally formed.

25. The coilable rule of claim 22 wherein said blade locking means and said casing have cooperating means thereon releasably engageable upon movement of said actuator button to hold said blade locking means in said blade releasing position, and wherein said cooperating means comprise a shoulder on said casing and a boss on said lock arm providing a cooperating shoulder.

26. The coilable rule of claim 25 wherein said button is depressible to effect such blade releasing movement of said blade locking means, and wherein said button is both depressible and movable parallel to the plane of said casing end walls to effect engagement of said cooperating means.

* * * * *

UNITED STATES PATENT AND TRADEMARK OFFICE
CERTIFICATE OF CORRECTION

PATENT NO. : 4,449,302
DATED : May 22, 1984
INVENTOR(S) : Mark Drechsler and Walter J. Hutchins It is certified that error appears in the above—identified patent and that said Letters Patent is hereby corrected as shown below:

Column 8, line 10, "locking means" should be -- lock arm --, line 18, "blade arm" should be -- lock arm --.

Signed and Sealed this

Sixteenth Day of October 1984

[SEAL]

Attest:

GERALD J. MOSSINGHOFF

Attesting Officer

Commissioner of Patents and Trademarks